United States Patent
Ejiri

(10) Patent No.: US 7,410,708 B2
(45) Date of Patent: Aug. 12, 2008

(54) MAGNETIC REPRODUCING METHOD AND MAGNETIC RECORDING MEDIUM

(75) Inventor: Kiyomi Ejiri, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 309 days.

(21) Appl. No.: 10/924,823

(22) Filed: Aug. 25, 2004

(65) Prior Publication Data

US 2005/0048324 A1  Mar. 3, 2005

(30) Foreign Application Priority Data

Aug. 27, 2003  (JP) ............ P.2003-303037

(51) Int. Cl.
*G11B 5/68* (2006.01)
(52) U.S. Cl. ............ 428/842; 360/131; 428/842; 428/409
(58) Field of Classification Search ............ None
See application file for complete search history.

(56) References Cited

U.S. PATENT DOCUMENTS

| | | | |
|---|---|---|---|
| 5,364,547 A * | 11/1994 | Babb et al. ............ | 508/569 |
| 5,718,964 A | 2/1998 | Naoe et al. | |
| 5,904,979 A * | 5/1999 | Kakuishi et al. ......... | 428/842.3 |
| 6,128,163 A * | 10/2000 | Haddock et al. ......... | 360/237.1 |
| 6,803,131 B2 * | 10/2004 | Ikeda et al. ............. | 428/835.5 |
| 2002/0197513 A1 * | 12/2002 | Murao et al. .......... | 428/694 BS |
| 2004/0214048 A1 * | 10/2004 | Ide et al. ............... | 428/694 TR |

FOREIGN PATENT DOCUMENTS

| | | |
|---|---|---|
| JP | 9-115130 A | 5/1997 |
| JP | 9-128739 A | 5/1997 |
| JP | 2001-325709 A | 11/2001 |
| JP | 2002-175619 A | 6/2002 |
| JP | 2002-269719 A | 9/2002 |
| JP | 2003-228816 A | 8/2003 |

* cited by examiner

*Primary Examiner*—Kevin M Bernatz
(74) *Attorney, Agent, or Firm*—Sughrue Mion, PLLC

(57) ABSTRACT

A method for reproducing information recorded on a magnetic recording medium comprising, in the following order, a non-magnetic flexible support, a non-magnetic lower layer containing non-magnetic powder and a binder, and a magnetic layer containing ferromagnetic powder, a binder and an abrasive, the magnetic layer having an average thickness of 30 to 150 nm, a density of projections having a height of 10 nm or more of 2,000 to 10,000 per 100 $\mu m^2$ as measured by atomic force microscopy, and a scratch depth of 50 to 200 nm, the method comprising reading the magnetic recording medium with a magnetoresistive head having a magnetoresistive element, the magnetoresistive element being recessed 20 nm or less from a plane of contact with the magnetic recording medium.

14 Claims, No Drawings

MAGNETIC REPRODUCING METHOD AND MAGNETIC RECORDING MEDIUM

FIELD OF THE INVENTION

This invention relates to a magnetic reproducing method and a magnetic recording medium used therefor. More particularly, it relates to a method of reproducing high-density recorded magnetic information to obtain improved electromagnetic characteristics with minimized wear of a magnetoresistive (MR) head fit for high-density recording systems and a magnetic recording medium used to carry out the reproduction method.

BACKGROUND OF THE INVENTION

An MR head for high density recording has been used widely in hard disk applications. An MR head has recently come to be applied to backup tape systems. The MR head used in a backup tape system has its MR element recessed several tens of nanometers so as to avoid direct contact with tape and to prevent resultant wear. Causing a spacing loss, nevertheless, the recession should be minimized to realize high density recording. It is a technical difficulty to solve both the wear and spacing loss problems.

A dual-layer magnetic recording medium having a non-magnetic lower layer and a thin magnetic upper layer has been proposed as a medium suitable for high density recording. It has also been proposed to provide a thin magnetic upper layer with specific projections in order to satisfy both running durability and electromagnetic characteristics. For instance, JP-A-9-115130 proposes a magnetic recording medium that exhibits improved running durability while retaining excellent electromagnetic characteristics. The proposed medium has a magnetic layer with a thickness of 0.05 to 0.9 μm on a non-magnetic layer, the magnetic layer having specific densities of projections of specific heights as measured by atomic force microscopy (AFM). However, the height of the projections specified in claim 1 of JP-A-9-115130 (i.e., 25 to 40 nm) is greater than the depth of the recess of the MR head, and therefore the magnetic recording medium abrades the MR element easily.

With respect to the MR head wear problem, JP-A-2001-325709 discloses a magnetic recording medium having a specific density of 5 to 10 nm high projections of abrasive grains. JP-A-9-128739 teaches that MR head wear can be reduced by lowering the height of projections of abrasive grains than that of projections of particles other than abrasive grains so as to avert direct contact of the head with the abrasive grains.

The medium of JP-A-2001-325709 produces insufficient cleaning effects because of lack of height of abrasive projections and easily causes head contamination. The medium of JP-A-9-128739 is effective when combined with an 8 mm video head as described but insufficient for an MR element having a soft film.

SUMMARY OF THE INVENTION

An object of the invention is to provide a magnetic reproducing method and a magnetic recording medium therefor that reduce wear of an MR head having a shallow recess for high density recording and bring about improved electromagnetic characteristics.

As a result of extensive investigations, the present inventors have found that the following construction eliminates the problems of the above-described conventional techniques and achieves improved electromagnetic characteristics while reducing MR head wear.

The present invention provides, in its first aspect, a method of reproducing information recorded on a magnetic recording medium having a non-magnetic flexible support, a non-magnetic lower layer containing non-magnetic powder and a binder as main components provided on the support, and a magnetic layer containing ferromagnetic powder, a binder, and an abrasive as main components provided on the lower layer. The magnetic layer has an average thickness of 30 to 150 nm, a density of projections having a height of 10 nm or more of 2,000 to 10,000 per 100 $\mu m^2$ as measured by AFM, and a scratch depth of 50 to 200 nm. The magnetic information is reproduced with an MR head having an MR element. The MR head has the MR element recessed 20 nm or less from the plane of contact with the magnetic recording medium.

In a preferred embodiment of the magnetic reproducing method, the magnetic layer contains 5 to 20 parts by weight, per 100 parts by weight of the magnetic powder, of abrasive particles having 1 to 2.5 times as large an average particle size as the average thickness of the magnetic layer and a Mohs hardness of 5 or more.

The present invention also provides, in its second aspect, a magnetic recording medium used to carry out the above-described magnetic reproducing method.

To limit the magnetic layer's thickness to 30 to 150 nm is means for improving C/N and resolution in reproducing digital information with an MR head. To provide a thin magnetic layer on a non-magnetic layer is known effective to prevent coating defects of the magnetic layer and to realize surface smoothness of the magnetic layer. To limit the depth of the recess of the MR head to 20 nm or smaller is to minimize the spacing loss and thereby to enable high density recording.

Two thousand to ten thousand projections of 10 nm or more in height per 100 $\mu m^2$ of the magnetic layer create a moderate thickness of an air layer between the running recording surface and the head, which stabilizes the running of the medium.

There are two mechanisms that seem to account for wear of an MR element. One is that the magnetic layer of a magnetic recording medium is attracted into the 20 nm or even shallower recess of the head during running, and the surface projections of the magnetic recording medium come into contact with the head element to cause wear. The other is that the magnetic layer surface projections abrade the peripheral protecting material (e.g., AlTiC), and the wear debris accumulates in the recess to abrade the MR element. In either case, MR head wear occurs by the contact with magnetic layer's surface projections including abrasive grains. In the present invention, the scratch depth of the magnetic layer having the above-recited thickness and projection density is limited within a range of from 50 to 200 nm, preferably from 50 to 150 nm, and more preferably from 60 to 130 nm. This means that the magnetic layer exerts some cushioning effect on the projections. As a result, the head wear is reduced, and the magnetic layer maintains film strength.

When the particle size of the abrasive used in the magnetic layer is 1 to 2.5 times the magnetic layer's thickness, the magnetic layer is provided with improved durability against excessive impact if applied thereto. The abrasive action of such abrasive particles is suppressed by the above-described cushioning effect under an ordinary running condition. In case a large pressure is applied on the magnetic layer, the abrasive particles serve as protection against the impact of pressure.

Thus, the method of magnetic reproduction according to the present invention reduces wear of an MR head for high density recording and improves electromagnetic characteristics.

DETAILED DESCRIPTION OF THE INVENTION

The magnetic layer of the magnetic recording medium according to the invention has an average thickness d of 30 to 150 nm, preferably 50 to 120 nm. The effects of the invention are independent of whether the magnetic layer has a single layer structure or a multilayer structure. In the case of the latter, known technologies relative to a multiple magnetic layer structure disclosed in, for example, JP-A-6-139555 are applicable. It is ideally preferred for the magnetic layer to have no thickness variation because saturation recording is implemented by the small thickness of the magnetic layer. Thickness variations of the magnetic layer are acceptable practically as long as the ratio of standard deviation σ to average thickness d is not greater than 0.5. The σ to d ratio is preferably not greater than 0.3.

Methods for reducing the σ include (a) rendering the coating composition for a non-magnetic lower layer thixotropic, (b) using acicular non-magnetic powder in the non-magnetic lower layer, and (c) forming the non-magnetic lower layer and the magnetic upper layer by wet-on-dry technology, as taught in Japanese Patent 2566096.

The magnetic layer preferably has a residual magnetization φr of 0.005 to 0.05 T·μm (50 to 500 G·μm). The residual magnetization is optimized within such a range that the MR head used may not be saturated. The relationship between φr of an evaporated tape and the saturation magnetization·thickness of an MR head is described in JP-A-10-134306 and ITE Technical Report, Vol. 23, No. 78, p. 21 (1999). It is desirable that particulate media satisfy the same relationship. Such optimization of residual magnetization can be effected by adjusting the amount of the binder, the saturation magnetization of the magnetic powder, and the like. For example, where the magnetic layer is designed to have a relatively small thickness (e.g., 0.05 μm or even smaller) to meet the demand for overwrite performance, an alloy powder with a relatively high saturation magnetization σs (e.g., 110 to 120 A·m²/kg (110 to 120 emu/g)) is recommended as magnetic powder.

The volume packing density of the ferromagnetic alloy powder in the magnetic layer is 30% or higher, preferably 35% or higher, still preferably 38% or higher.

The magnetic powder which can be used in the invention includes acicular alloy powder or hexagonal ferrite powder having a saturation magnetization σs of 120 A·m²/kg (120 emu/g) or less, preferably 80 to 120 A·m²/kg (80 to 120 emu/g), still preferably 90 to 110 A·m²/kg (90 to 110 emu/g). The acicular alloy powder has an average length of 0.1 μm or smaller, preferably 0.03 to 0.08 μm, a breadth of 0.005 to 0.02 μm, preferably 0.008 to 0.015 μm, and an aspect ratio (length/breadth) of 3 to 15, preferably 5 to 10. The hexagonal ferrite powder has an average diameter of 15 to 40 nm, preferably 20 to 35 nm and an aspect ratio (diameter/thickness) of 2 to 5. Both the acicular alloy powder and hexagonal ferrite powder have an average particle volume of 1500 to 15000 nm³, preferably 2000 to 12000 nm³, still preferably 3000 to 10000 nm³, and a coercive force Hc of 167.1 kA/m (2100 Oe) or more. While a higher Hc is preferred from the principle of recording, a practically suitable Hc would be 175.1 to 278.6 kA/m (2200 to 3500 Oe) in view of the capacity of a recording head.

The magnetic powder may contain additional elements, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. The powder can be treated with Al, Si, Ta, Y, etc. by adhesion or dissolution to have improved thermal stability. Addition of Co, Sm, Nd, etc. in an amount of 5 to 40% by weight based on Fe is known effective to increase the Hc. The magnetic powder may be treated with a dispersant, a lubricant, a surface active agent, an antistatic agent, etc. prior to being dispersed in the binder.

The binder to be used in the magnetic upper layer can be chosen from among known ones. In order to obtain the specified scratch depth, it is preferred to use binders having excellent toughness and a high glass transition temperature (Tg), such as the polyurethane resins containing a dimer diol having a cyclic structure disclosed in JP-A-2001-134921.

The binder preferably contains a functional group accelerating adsorption to magnetic powder, such as $SO_3M$ or $PO_3M$. The binder has a molecular weight of 10,000 to 100,000, preferably 20,000 to 60,000. The binder is used in an amount of 5 to 25 parts, preferably 5 to 20 parts, still preferably 5 to 15 parts, per 100 parts by weight of the magnetic powder.

The abrasive that can be used in the magnetic layer is selected from those having a Mohs hardness of 5 or greater, including α-alumina, $Cr_2O_3$, α-$Fe_2O_3$, and SiC. The average particle size of the abrasive is preferably 1 to 2.5 times, still preferably 1.2 to 2 times, the thickness of the magnetic layer. Too big abrasive grains cause noise and dropouts. Moreover, the cushioning effect of the magnetic layer does not work on such big grains, resulting in increased wear of the head. The abrasive is used in an amount of 5 to 20 parts, preferably 5 to 15 parts, per 100 parts by weight of the magnetic powder. With respect to the pH and the surface treatment of the abrasive, known technologies can be applied.

The magnetic layer has 2000 to 10000, preferably 2000 to 8000, more preferably 2500 to 6000 projections of 10 nm or more in height per 100 μm³ as measured by AFM. The recited projection density can be obtained by, for example, (a) incorporating non-magnetic particles having a Mohs harness less than 5 and an average particle size 0.5 to 1.5 times the magnetic layer's thickness, (b) controlling the disperse state of the coating composition, or (c) controlling the surface condition by calendering. These methods can be used in combination.

The non-magnetic powder that can be used as a main component of the non-magnetic lower layer includes known metal oxide and non-oxide particles of any shape including acicular (needle-like) and non-acicular shapes. The non-acicular non-magnetic powder has an average diameter of 0.01 to 0.2 μm, preferably 0.02 to 0.15 μm. The acicular non-magnetic powder has an average length of 0.2 μm or less, preferably 0.05 to 0.15 μm. The acicular non-magnetic powder preferably has an aspect ratio of 3 to 10. A particularly preferred non-magnetic powder is an acicular metal oxide powder having a pH of 5 or higher because it is highly adsorbable by the functional group of the binder and therefore well dispersible in the binder and also it imparts mechanical strength to the coating film.

The non-magnetic powder has a DBP (dibutyl phthalate) oil absorption of 5 to 100 ml/100 g, preferably 10 to 80 ml/100 g, still preferably 20 to 60 ml/100 g, and a specific gravity of 1 to 12, preferably 3 to 6. The non-magnetic powder preferably has an ignition loss of 20% by weight or less.

The non-magnetic powder for use in the lower non-magnetic layer preferably has a Mohs hardness of 4 or higher; a surface roughness factor of 0.8 to 1.5, still preferably 0.9 to 1.2; a stearic acid (SA) adsorption of 1 to 20 μmol/m², still preferably 2 to 15 μmol/m²; and a heat of immersion of 20 to 60 μJ (200 to 600 erg/cm²) in water at 25° C. Solvents in which the non-magnetic powder releases the recited heat of immersion can be used. The number of water molecules on the non-magnetic powder at 100° to 400° C. is suitably 1 to 10 per 100 A. The pH of the non-magnetic powder at the isoelectric point in water is preferably between 5 and 10.

It is preferred that the non-magnetic powder be surface treated with $Al_2O_3$, $SiO_2$, $TiO_2$, $ZrO_2$, $SnO_2$, $Sb_2O_3$ or ZnO. Among the treating compounds, preferred for dispersibility are $Al_2O_3$, $SiO_2$, $TiO_2$, and $ZrO_2$. These oxides may be used either individually or in combination. According to the purpose, a composite surface layer can be formed by co-precipitation or a method comprising first applying alumina to the non-magnetic particles and then treating with silica or vise versa. The surface layer may be porous for some purposes, but a homogeneous and dense surface layer is usually preferred. Specific examples of the acicular non-magnetic powders include oxides, such as $TiO_2$, hematite, α-alumina, γ-alumina, $ZrO_2$, $CeO_2$, $Cr_2O_3$, and $SiO_2$, and non-magnetic metals.

The lower layer preferably contains, in addition to the above-described acicular non-magnetic powder, a non-acicular powder having an average particle size of 50 nm or smaller, preferably 40 nm or smaller, and a true specific gravity of 5 or less in an amount of 5 to 30 parts by weight per 100 parts by weight of the acicular non-magnetic powder. Examples of such non-acicular powders are oxides (e.g., $TiO_2$, hematite, alumina, $ZrO_2$, $CeO_2$, $Cr_2O_3$, and $SiO_2$), non-magnetic metals, organic resin fillers, and carbon black. Carbon black having an average particle size of 30 nm or smaller is especially suitable. The binder to be used in the non-magnetic lower layer can be the same as or similar to those used in the magnetic upper layer. Binders having the above-described functional group improving dispersing ability are preferred. The molecular weight of the binder is usually 20,000 to 50,000, preferably 30,000 to 50,000. Too much molecular weight can reduce the calendering effect. It is effective for improving dispersibility to surface treat the non-acicular powder with alumina or an aromatic phosphorous compound as taught in Japanese Patents 2566088 and 2634792.

The thickness of the lower layer usually ranges 0.3 to 3 μm, preferably 0.5 to 2 μm.

The binder of the magnetic upper layer and the non-magnetic lower layers can contain polyisocyanate compounds, including tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products between these polyisocyanates and polyols; and polyisocyanate compounds produced by condensation of the above-recited polyisocyanates. Examples of commercially available polyisocyanates which can be used in the invention are Coronate L, Coronate HL1, Coronate 2030, Coronate 2031, Millionate MR, and Millionate MTL (from Nippon Polyurethane Industry Co., Ltd.); Takenate D-102, Takenate D-110N, Takenate D-200, and Takenate D-202 (from Takeda Chemical Industries, Ltd.); and Desmodur L, Desmodur IL, Desmodur N, and Desmodur HL (from Sumitomo Bayer Urethane Co., Ltd.). They can be used in each layer, either alone or as a combination of two or more thereof taking advantage of difference in curing reactivity.

Carbon black that can be used in the upper layer includes furnace black for rubber, thermal black for rubber, carbon black for colors, and acetylene black. The carbon black preferably has a specific surface area of 5 to 500 $m^2$/g, a DBP oil absorption of 10 to 400 ml/100 g, a particle size of 5 to 300 nm, a pH of 2 to 10, a water content of 0.1 to 10% by weight, and a tap density of 0.1 to 1 g/ml. Specific examples of commercially available carbon black which can be used in the invention include Black Pearls 2000, 1300, 1000, 900, 800, and 700, and Vulcan XC-72 (from Cabot Corp.); #80, #60, #55, #50, and #35 (from Asahi Carbon Co., Ltd.); #2400B, #230, #900, #1000, #30, #40, and #10B (from Mitsubishi Chemical Corp.); and Conductex SC, RAVEN 150, 50, 40, and 15 (from Columbian Carbon). Carbon black having been surface treated with a dispersant, etc., carbon black having been subjected to surface treatment with a dispersant, resin-grafted carbon black, or carbon black with its surface partially graphitized may be used. Carbon black may previously been dispersed in a binder before being added to a coating composition. The recited carbon black species can be used either individually or as a combination thereof. The carbon black, if used in the magnetic layer, is preferably used in an amount of 0.1 to 30% by weight based on the ferromagnetic powder.

In general, carbon black serves for antistatic control, reduction of frictional coefficient, reduction of light transmission, film strength enhancement, and the like. These functions vary among species. Accordingly, it is possible, or rather desirable, to optimize the kinds, amounts, and combinations of the carbon black species for each layer according to the intended purpose with reference to various characteristics, such as particle size, oil absorption, conductivity, pH, and so forth. In selecting carbon black species to be used, reference can be made, e.g., in Carbon Black Kyokai (ed.), *Carbon Black Binran*.

Organic solvents that can be used in the invention include ketones, such as methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as glycol dimethyl ether, glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N,N-dimethylformamide; hexane; and their mixtures at arbitrary mixing ratios. These organic solvents do not always need to be 100% pure and may contain impurities, such as isomers, unreacted matter, by-products, decomposition products, oxidation products, and water. The impurity content is preferably 30% or less, still preferably 10% or less.

The organic solvent used in the magnetic layer and that in the non-magnetic layer are preferably the same in kind but may be different in amount. It is advisable to use a solvent with high surface tension (e.g., cyclohexanone or dioxane) in the non-magnetic lower layer to improve coating stability. Specifically, it is important that the arithmetic mean of the solvent composition of the upper layer be equal to or higher than that of the lower layer. A solvent with somewhat high polarity is preferred for improving dispersibility of powders. The solvent formulation preferably contains at least 50% of a solvent having a dielectric constant of 15 or higher. The solubility parameter of the solvent or the mixed solvent is preferably 8 to 11.

The thickness of the non-magnetic flexible support is 1 to 100 μm, preferably 3 to 80 μm. An undercoating layer for adhesion improvement may be provided between the support and the lower layer. The undercoating layer usually has a thickness of 0.01 to 2 μm, preferably 0.02 to 0.5 μm. A backcoating layer may be provided on the side opposite to the magnetic layer side. The backcoating layer usually has a thickness of 0.1 to 2 μm, preferably 0.3 to 1.0 μm. The undercoating layer and the backcoating layer can be of known materials.

Known base films, such as polyesters (e.g., polyethylene terephthalate and polyethylene naphthalate), polyolefins, cellulose triacetate, polycarbonate, aliphatic polyamides, aromatic polyamides, polyimide, polyamideimide, polysulfone, and aramid can be used. The support may be subjected to surface treatment, such as corona discharge treatment, plasma treatment, treatment for easy adhesion, heat treatment, and dustproof treatment.

The non-magnetic support for use in tape media has a Young's modulus of 3920 to 14700 MPa (400 to 1500 kg/mm$^2$), preferably 4900 to 12740 MPa (500 to 1300 kg/mm$^2$), in the machine direction (MD) and of 4900 to 19600 MPa (500 to 2000 kg/mm$^2$), preferably 6860 to 17640 MPa (700 to 1800 kg/mm$^2$) in the transverse direction (TD) at a TD/MD ratio of 1/1 to 1/5, preferably 1/1 to 1/3.

The support preferably has a thermal shrinkage of 3% or less, still preferably 1.5% or less, at 100° C.×30 minutes and of 1% or less, still preferably 0.5% or less, at 80° C.×30 minutes, in both the tape running direction and the cross direction and a breaking strength of 49 to 980 MPa (5 to 100 kg/mm$^2$) in both the tape running direction and the cross direction.

The Methods of preparing the magnetic and non-magnetic coating compositions include at least the steps of kneading and dispersing and, if desired, the step of mixing which is provided before or after the step of kneading and/or the step of dispersing. Each step may be carried out in two or more divided stages. Any of the materials, including the magnetic powder, non-magnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step provided for adjusting the viscosity of the dispersion.

To accomplish the object of the invention, known techniques for coating composition preparation can be applied as a part of the method. A magnetic recording medium having a high residual magnetic flux density (Br) can be obtained by using a kneading machine with high kneading power, such as a continuous kneader or a pressure kneader. In using a continuous kneader or a pressure kneader, the magnetic or non-magnetic powder, the whole or a part (preferably at least 30% by weight of the total binder) of the binder, and 15 to 500 parts by weight of a solvent per 100 parts by weight of the magnetic or non-magnetic powder are kneaded together. For the details of the kneading operation, reference can be made in JP-A-1-106338 and JP-A-64-79274. In the preparation of the non-magnetic coating composition for lower layer, a high specific gravity dispersing medium is used preferably. Zirconia beads are suitable.

Methods and equipment for producing the magnetic recording medium according to the invention, which has a dual layer structure, include the following:

(1) A lower layer is first applied by using a coating apparatus generally employed for a magnetic coating composition, such as a gravure coater, a roll coater, a blade coater or an extrusion coater. While the lower layer is wet, an upper layer is applied by means of an extrusion coating apparatus disclosed in JP-B-1-46186, JP-A-60-238179, and JP-A-2-265672 which is of the type in which a support is pressed while coated.

(2) A lower layer and an upper layer are applied almost simultaneously through a single coating head disclosed in JP-A-63-88080, JP-A-2-17971, and JP-A-2-265672, the coating head having two slits through which the respective coating liquids pass.

(3) A lower layer and an upper layer are applied almost simultaneously by means of an extrusion coating apparatus disclosed in JP-A-2-174965, the apparatus being equipped with a back-up roll.

In order to prevent reduction of electromagnetic characteristics due to agglomeration of magnetic particles, it is advisable to give shear to the coating composition in the coating head. The techniques taught in JP-A-62-95174 and JP-A-1-236968 are suited for shear application. The coating compositions should satisfy the viscosity requirement specified in JP-A-3-8471.

The magnetic layer should be strongly oriented to provide the magnetic recording medium of the invention. Orientation is preferably carried out with a solenoid having a magnetic power of 0.1 T (1000 G) or higher and a cobalt magnet having a magnetic power of 0.2 T (2000 G) or higher arranged with the same poles facing to each other. A step of moderate drying is preferably provided upstream the step of orientation such that the degree of orientation reaches the highest after final drying. In the preparation of disk media, the layer should rather be subjected to random orientation.

Calendering is carried out with metallic rolls or rolls of heat-resistant plastics, such as epoxy resins, polyimide, polyamide and polyimide-amide. Calendering is preferably carried out at a temperature of 70° C. or higher, still preferably 80° C. or higher, under a linear pressure of 200 kg/cm or higher, still preferably 300 kg/cm or higher. The magnetic recording medium of the invention preferably has a coefficient of friction of 0.5 or smaller, still preferably 0.3 or smaller, against SUS 420J on each of the magnetic layer side and the opposite side. The magnetic recording medium preferably has a surface resistivity of $10^4$ to $10^{12}$ Ω/sq. The magnetic layer preferably has an elastic modulus at 0.5% elongation of 980 to 19600 MPa (100 to 2000 kg/mm$^2$) in both the running and cross directions and a breaking strength of 9.8 to 294 kPa (1 to 30 kg/cm$^2$). The magnetic recording medium preferably has an elastic modulus of 980 to 14700 MPa (100 to 1500 kg/mm$^2$), a residual elongation of 0.5% or less, and a thermal shrinkage of not more than 1%, still preferably not more than 0.5%, particularly preferably 0.1% or less, at or below 100° C. in both the running and cross directions. The glass transition temperature (maximum loss elastic modulus in dynamic viscoelasticity measurement at 110 Hz) of the magnetic layer is preferably 50° to 120° C., and that of the lower layer is preferably 0° to 100° C. The loss elastic modulus preferably ranges from $1\times10^2$ to $8\times10^3$ N/cm$^2$ ($1\times10^8$ to $8\times10^9$ dyne/cm$^2$). The loss tangent is preferably 0.2 or lower. Too high a loss tangent easily leads to a tack problem.

The residual solvent content in the magnetic layer is preferably 100 mg/m$^2$ or less, still preferably 10 mg/m$^2$ or less. The upper and the lower layers each preferably have a void of 30% by volume or less, still preferably 20% by volume or less. While a lower void is better for high output, there are cases in which a certain level of void is recommended. For instance, a relatively high void is often preferred for recording media which put weight on durability against repeated use. In the case of tape media, a squareness (SQ) in the running direction is 0.70 or greater, preferably 0.75 or greater, particularly preferably 0.85 or greater, measured in a magnetic field of 398 kA/m (5 kOe). The squarenesses in the two directions perpendicular to the running direction are preferably 80% or smaller than that in the running direction. The magnetic layer preferably has a switching field distribution (SFD) of 0.6 or smaller.

The magnetic layer has such a roughness profile that the roughness component intensity at wavelengths of 1 to 5 μm is 0.2 nm² or less and that at wavelengths of 0.5 to 1.0 μm is 0.02 to 0.1 nm². Although a smaller roughness intensity is advantageous for obtaining an increased carrier-to-noise ratio, it is necessary for obtaining satisfactory running durability to maintain the roughness intensity of wavelengths of 0.5 to 1.0 μm in the range of 0.02 to 1.0 nm².

EXAMPLES

The present invention will now be illustrated in greater detail with reference to Examples, but it should be understood that the invention is not construed as being limited thereto. Unless otherwise noted, all the parts and percents are given by weight.

Example 1

| 1) Preparation of coating compositions | |
|---|---|
| 1-1) Formulation of coating composition for non-magnetic lower layer | |
| Non-magnetic powder (α-Fe₂O₃) average length: 0.1 μm; aspect ratio: 8.5; BET specific surface area: 56 m²/g; pH: 8; Fe₂O₃ content: ≧90%; DBP oil absorption: 27 to 38 ml/100 g; surface coating compound: Al₂O₃ | 80 parts |
| Carbon black average primary particle size: 16 nm; DBP oil absorption: 80 ml/100 g; pH: 8.0; BET specific surface area: 250 m²/g; volatile content: 1.5% | 20 parts |
| Vinyl chloride copolymer MR110 (from Zeon Corp.) | 10 parts |
| Polyester polyurethane resin B molecular weight: 35,000; Tg: 75° C.; neopentyl glycol/caprolactone polyol/4,4'-diphenylmethane diisocyanate (MDI) = 0.9/2.6/1; —SO₃Na group content: 1 × 10⁻⁴ eq/g | 5 parts |
| Butyl stearate | 1 part |
| Stearic acid | 1 part |
| Methyl ethyl ketone | 100 parts |
| Cyclohexanone | 50 parts |
| Toluene | 50 parts |
| 1-2) Formulation of coating composition for upper magnetic layer | |
| Ferromagnetic metal powder Fe/Co = 70/30; Hc: 183.1 kA/m (2300 Oe): BET specific surface area: 68 m²/g; crystallite size: 120 Å; surface coating compound: Al₂O₃; particle size (length): 0.05 μm; aspect ratio: 5; σs: 108 A.m²/kg (108 emu/g) | 100 parts |
| Polyurethane resin A containing dimer diol as polyol; molecular weight: 42000; Tg: 157° C.; —SO₃Na group content: 1 × 10⁻⁴ eq/g | 15 parts |
| α-Alumina (average particle size: 0.17 μm) | 10 parts |
| Carbon black (average particle size: 0.10 μm) | 10 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

The components shown in each of the above-described formulations were kneaded in a continuous kneader and dispersed in a sand mill. Three parts and 1 part of polyisocyanate were added to the resulting non-magnetic and magnetic dispersions, respectively. Forty parts of a methyl ethyl ketone/cyclohexanone mixed solvent was added to each dispersion. The resulting mixtures were each filtered through a filter having an average pore size of 1 μm to prepare a non-magnetic coating composition for lower layer and a magnetic coating composition for upper layer.

2) Preparation of Magnetic Recording Tape

A 6 μm thick polyethylene naphthalate base film having a Young's modulus of 600 kg/m³ and 900 kg/m³ in the MD and TD, respectively, was prepared. The coating composition for lower layer was applied to the base film to a dry thickness of 1.2 μm. Immediately thereafter, the coating composition for upper layer was applied to a dry thickness of 100 nm by wet-on-wet coating. While the two coating layers were wet, the ferromagnetic powder was oriented with a cobalt magnet having a magnetic power of 0.3 T (3000 G) and a solenoid having a magnetic power of 1.5 T (1500 G). After drying, the coated film was calendered on 7-roll calender composed of metal rolls at 90° C. The resulting coated film was slit to a width of 12.65 mm to obtain a tape.

3) Evaluation a) Signal-to-noise Ratio (SNR)

Measured on an LTO Gen 2 tape drive equipped with an MR head having a 15 nm deep recess on the MR element. The relative tape running speed was 4 m/sec. The linear density was 160 kfci (bit length: 0.166 μm). The reproduction track width was 12.7 μm.

b) Projection Density

The number of 10 nm or higher projections in a 30 μm side square was measured by AFM with a Digital Instruments Nanoscope III equipped with a square pyramidal SiN probe (vertex angle of faces: 70°). The number was converted to density per 100 μm side square.

c) Scratch Depth

The magnetic layer surface was scratched with a diamond stylus of 100 μm in radius under a 10 g load, at a speed of 10 cm/min in an environment of 23° C. and 50% RH using surface property measuring equipment Heidon 14 from Shinto Kagaku K.K. The widthwise middle of the cross-section of the scratch was examined with a three-dimensional profilometer TOPO-3D from Wyko to measure peak-to-valley, which was referred to as a scratch depth.

d) Head Wear

After the magnetic tape was run on the same drive as used in (a) above for consecutive 100 hours, the depth of the recess of the MR head was measured with Nanoscope III. The difference from the depth before running was taken as a head wear.

e) Error Increase

The magnetic tape was run in the same manner as in (d) above. The before-to-after ratio of error rates was obtained as an error increase.

The results of evaluations are shown in Table 1 below.

Example 2

A magnetic recording medium was produced in the same manner as in Example 1, except for reducing the magnetic layer thickness to 50 nm, increasing the amount of carbon in the magnetic layer to 15 parts, reducing the particle size of the abrasive (α-alumina) in the magnetic layer to 110 nm, and lowering the calendering temperature to 75° C. thereby to increase the surface projection density and the scratch depth. The medium was evaluated in the same manner as in Example 1. The results obtained are shown in Table 1.

Example 3

A magnetic recording medium was produced in the same manner as in Example 1, except for (i) reducing the amount of carbon in the magnetic layer to 5 parts, (ii) reducing the particle size of the abrasive (α-alumina) in the magnetic layer to 110 nm, and (iii) decreasing the amount of the abrasive to 7 parts thereby to increase the surface projection density and the scratch depth and (iv) reducing the recess depth of the MR head to 10 nm. The medium was evaluated in the same manner as in Example 1. The results obtained are shown in Table 1.

Example 4

A magnetic recording medium was produced in the same manner as in Example 1, except for increasing the magnetic layer thickness to 135 nm and increasing the amount of the abrasive in the magnetic layer to 18 parts. The medium was evaluated in the same manner as in Example 1. The results obtained are shown in Table 1.

Comparative Example 1

A magnetic recording medium was produced in the same manner as in Example 1, except for (i) replacing the polyurethane A of the magnetic layer with the polyurethane B used in the lower layer, (ii) increasing the particle size of the abrasive in the magnetic layer to 300 nm, and (iii) increasing the amount of the abrasive to 12.5 parts thereby to increase the surface projection density and the scratch depth and (iv) increasing the recess depth of the MR head to 30 nm. The medium was evaluated in the same manner as in Example 1. The results obtained are shown in Table 1.

Comparative Example 2

A magnetic recording medium was produced in the same manner as in Example 1, except for (i) raising the calendering temperature to 100° C. to make the surface harder and to reduce the scratch depth and (ii) increasing the recess depth of the MR head to 30 nm. The medium was evaluated in the same manner as in Example 1. The results obtained are shown in Table 1.

Comparative Example 3

A magnetic recording medium was produced in the same manner as in Example 1, except for (i) replacing the polyurethane A of the magnetic layer with a polyurethane resin C having a Tg of 30° C., (ii) increasing the magnetic layer thickness to 200 nm, (iii) reducing the particle size of the abrasive in the magnetic layer to 110 nm, (iii) increasing the amount of the abrasive to 23 parts, and (iv) lowering the calendering temperature to 75° C. thereby to increase the scratch depth. The medium was evaluated in the same manner as in Example 1. The results obtained are shown in Table 1.

Comparative Example 4

A magnetic recording medium was produced in the same manner as in Example 1, except for (i) reducing the amount of carbon in the magnetic layer to 2 parts, (ii) replacing the polyurethane A of the magnetic layer with the polyurethane B used in the lower layer, (iii) decreasing the amount of the abrasive to 4.5 parts thereby to decrease the surface projection density and increase the scratch depth. The medium was evaluated in the same manner as in Example 1. The results obtained are shown in Table 1.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Magnetic Layer | Polyurethane | A | A | A | A | B | A | C | B |
|  | Carbon (part) | 10 | 15 | 5 | 10 | 10 | 10 | 10 | 2 |
|  | Calendering Temperature (° C.) | 90 | 75 | 90 | 90 | 90 | 100 | 75 | 75 |
| Magnetic Layer | Thickness (nm) | 100 | 50 | 100 | 135 | 100 | 100 | 200 | 100 |
|  | Surface Projection Density (/100 μm sq) | 4500 | 9500 | 2200 | 3600 | 12000 | 3200 | 4800 | 1750 |
|  | Size of Abrasive (nm) | 170 | 110 | 110 | 170 | 300 | 170 | 110 | 110 |
|  | Amount of Abrasive (part) | 10 | 10 | 7 | 18 | 12.5 | 10 | 23 | 4.5 |
|  | Scratch Depth (nm) | 82 | 185 | 65 | 105 | 250 | 40 | 220 | 230 |
| MR Head & Evaluation Results | Recess Depth (nm) | 15 | 15 | 10 | 15 | 30 | 30 | 15 | 15 |
|  | SNR (dB) | 6.5 | 5.9 | 7.2 | 6.3 | 1.5 | 3.2 | 1.5 | 1.5 |
|  | Head Wear (nm) | 12 | 18 | 15 | 21 | 90 | 78 | 14 | 5 |
|  | Error Increase | 6 | 5 | 12 | 4.5 | 250 | 160 | 500 | 3000 |

It is seen from Table 1 that the magnetic recording medium and reproduction method of Examples 1 to 4 achieved a high SNR with a reduced head wear and a minimized error increase.

In Comparative Example 1 where the urethane resin A of the magnetic layer was replaced with the urethane resin B having a lower Tg and lower capability of dispersing powder than the urethane resin A, the scratch depth increased due to the low Tg, and the projection density increased due to the inferior dispersing capability. Because the depth of the recess for the MR head element was increased to 30 nm, the surface was too soft and was worn, resulting in increase of error, reduction of SNR, and acceleration of head wear.

In Comparative Example 2 where the calendering temperature was raised to make the magnetic layer surface harder, the head touch deteriorated, and the SNR reduced. The increase in depth of the recess for the MR head element to 30 nm resulted in increase of head wear.

In Comparative Example 3, the head wear was reduced by using the urethane resin C whose Tg was as low as 30° C. in the magnetic layer and conducting calendering at a low temperature. However, the magnetic layer was so weak that it was damaged during running, resulting in a considerable increase of error.

In Comparative Example 4, the projection density was too small to control the friction of the magnetic layer on account of the insufficient amount of carbon in the magnetic layer, which resulted in an increased error ratio and a reduced SNR.

This application is based on Japanese Patent application JP 2003-303037, filed Aug. 27, 2003, the entire content of which is hereby incorporated by reference, the same as if set forth at length.

What is claimed is:

1. A method for reproducing information recorded on a magnetic recording medium comprising a non-magnetic flexible support, a non-magnetic lower layer containing non-magnetic powder and a binder, and a magnetic layer containing ferromagnetic powder, a binder and an abrasive, in this order,
the magnetic layer having an average thickness of 30 to 135 nm a density of projections having a height of 10 nm or more of 2,000 to 10,000 per 100 μm2 as measured by atomic force microscopy, and a scratch depth of 65 to 185 nm determined using a 10 g load,
the method comprising reading the magnetic recording medium with a magnetoresistive head having a magnetoresistive element, the magnetoresistive element being recessed 15 nm or less from a plane of contact with the magnetic recording medium.

2. The reproduction method according to claim 1, wherein the magnetic layer contains 5 to 20 parts by weight, per 100 parts by weight of the magnetic powder, of abrasive particles having 1.1 to 2.5 times as large an average particle size as an average thickness of the magnetic layer and a Mohs hardness of 5 or more.

3. The reproduction method according to claim 2, wherein the abrasive particles have 1.2 to 2 times as large an average particle size as an average thickness of the magnetic layer.

4. The reproduction method according to claim 2, wherein the magnetic layer has an average thickness of 50 to 120 nm.

5. The reproduction method according to claim 1, wherein the non-magnetic powder has a Mohs hardness of 4 or higher.

6. The reproduction method according to claim 1, wherein at least part of a surface of the non-magnetic powder is covered with Al2O3, SiO2, TiO2, ZrO2, SnO2, Sb2O3 or ZnO.

7. The reproduction method according to claim 1, wherein at least part of a surface of the non-magnetic powder is covered with Al2O3, SiO2, TiO2, or ZrO2.

8. The reproduction method according to claim 1, wherein the lower layer has a thickness of 0.3 to 2 μm.

9. The reproduction method according to claim 1, wherein the lower layer has a thickness of 0.5 to 2 μm.

10. The reproduction method according to claim 1, wherein the binder contained in the magnetic layer is a polyisocyanate compound.

11. The reproduction method according to claim 1, wherein the binder contained in the lower layer is a polyisocyanate compound.

12. The reproduction method according to claim 1, which the magnetic layer contains carbon black.

13. The reproduction method according to claim 12, wherein the magnetic layer contains carbon black in a amount of 0.1 to 30% by weight based on the ferromagnetic powder.

14. A magnetic recording medium used in the magnetic reproduction method according to claim 1.

* * * * *